United States Patent Office

2,730,534
Patented Jan. 10, 1956

2,730,534

ANTHRAQUINONE DYESTUFFS

Milton L. Hoefle, David I. Randall and Edgar E. Renfrew, Easton, Pa., assignors to General Aniline & Film Corporation, New York, N. Y., a corporation of Delaware No Drawing. Application December 31, 1952,
Serial No. 329,106

6 Claims. (Cl. 260—373)

The present invention relates to the production of dyestuffs of the anthraquinone series, more particularly 2-unsubstituted-4-(x-sulfamylarylamino) anthraquinones devoid of sulfonic acid groups having the following general formula:

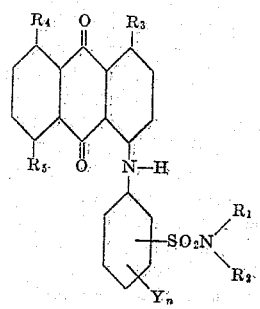

wherein $R_3$, $R_4$ and $R_5$ are selected from the group consisting of hydrogen, hydroxy, amino, alkylamino, arylamino and acylamino, $R_1$ is selected from the group consisting of alkyl, hydroxyalkyl, hydroxyalkoxyalkyl, hydroxypolyalkoxyalkyl, cyanoalkyl and, when taken together,

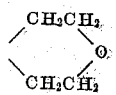

$R_2$ is selected from the group consisting of hydrogen, alkyl, hydroxyalkyl, hydroxyalkoxyalkyl, hydroxypolyalkoxyalkyl, cyanoalkyl and, when taken together,

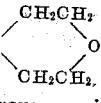

Y is selected from the group consisting of H, Cl, $NO_2$ and

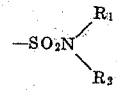

and $n$ has a value of 0 to 2. When $R_1$ and/or $R_2$ is hydroxypolyalkoxyalkyl, such radicals containing up to 5 alkoxy groups are preferred.

Dyestuffs of the above formula have been unexpectedly found to possess improved light fast and acid gas fast properties as compared with the same compounds not containing the sulfamyl groups. The improvement is particularly noticeable in pastel shades on cellulose acetates, in which case resistance to acid gas fading is a very important property. The shades obtainable range from red to blue-green and, as compared to the same compounds not containing the sulfamyl groups, are always shifted towards the red. For example, 1-anilino-4-hydroxyanthraquinone is a bluish-violet, whereas the same structure bearing in addition a sulfonamide group in the anilino moiety is a red-violet. Some of the dyestuffs of this invention, particularly those in which $R_1$ and $R_2$ are alkyls, may be used as plastics colorants because of their good light fasteness and brightness of shade. Such plastics may be in bulk or fiber form and may have a basis of nylon, Dacron, Orlon, Dynel, Acrilan or other polymeric material. Certain structures are of value as vat dyes, and others selected for their desirable solubility properties are excellent lacquer colors.

Following are some of the methods which may be employed to produce the dyestuffs of this invention:

I. An α-aminoanthraquinone may be condensed with a haloarylsulfonamide in the presence of an acid acceptor such as sodium carbonate, bicarbonate, or acetate and a catalyst such as copper, cuprous salts or cupric salts. The compounds may be caused to react by heating in the presence or absence of a diluent of the organic type such as nitrobenzene, quinoline, pyridine, etc.

Examples of an α-aminoanthraquinone which one may employ are:

1-aminoanthraquinone
1,4-diaminoanthraquinone
1,4,5-triaminoanthraquinone
1,4,5,8-tetraaminoanthraquinone
1-amino-4-methylaminoanthraquinone
1-amino-4-cyclohexylaminoanthraquinone
1,5-diaminoanthraquinone
1,8-diaminoanthraquinone
1-amino-4-anilinoanthraquinone
4-(4′-amino-1′-anthraquinonylamino)-methyl acetanilide
1-amino-4-hydroxyanthraquinone
4,5-diaminochrysazine
4,8-diaminoanthrarufin Examples of haloarylsulfonamides are:

1. 2,3 or 4-halo-N,N-dimethylbenzenesulfonamide
2. 2,3 or 4-halo-N-methylbenzenesulfonamide
3. 2,3, or 4-halo-N,N-bis(2-hydroxyethyl)benzenesulfonamide
4. 2,3 or 4-halo-N-(2-hydroxyethyl)benzenesulfonamide
5. 2,3 or 4-halo - N,N - bis(2-cyanoethyl)benzenesulfonamide in which halo is preferably bromine, but may be chlorine or iodine. A general method by which these compounds may be prepared is to allow the 2,3 or 4-halobenzenesulfonyl chloride to react with, respectively, amines such as dimethylamine, methylamine, diethanolamine, ethanolamine, and 2,2′-iminobispropionitrile.

6. 2,3 or 4-halo-N,N-bis{2 - [2 - (2 - hydroxyethoxy)ethoxy]-ethyl}benzenesulfonamide which is representative of the compounds which can be prepared by allowing the members of (4) above to react with ethylene oxide under suitable conditions.

7. 4-halo-3-nitro-N,N-dimethylbenzenesulfonamide
8. 4-halo-3-nitro-N-methylbenzenesulfonamide
9. 4-halo-3-nitro-N,N-bis(2-hydroxyethyl)benzenesulfonamide
10. 4-halo-3-nitro-N-(2 - hydroxyethyl)benzenesulfonamide
11. 4-halo-3-nitro-N,N-bis(2 - cyanoethyl)benzenesulfonamide in which halo is preferably chlorine or bromine. These compounds may be made by the following general method: 1-halo-2-nitrobenzene is chlorosulfonated and the resulting 4-halo-3-nitrobenzenesulfonyl chloride is allowed to react, respectively, with amines such as dimethylamine, methylamine, diethanolamine, ethanolamine and 2,2′-iminobispropionitrile.

12. 3,4-dihalo - N,N - bis-(2-hydroxyethyl)benzenesulfonamide, in which the term "halo" represents preferably chlorine or bromine. This compound may be made by chlorosulfonating a dihalobenzene and treating the resulting sulfonylchloride with diethanolamine. Other sulfonamides useful in this invention can be prepared by treating the dihalobenzenesulfonyl chloride described above, with amines such as dimethylamine, methylamine, ethanolamine, 2,2'-iminobis propionitrile and β-methylaminopropionitrile.

13. 2-chloro - 3,5 - dinitro-N,N-bis-(2-hydroxyethyl)benzenesulfonamides which may be prepared by treating the 2-chloro-3,5-dinitrobenzenesulfonyl chloride (prepared from the corresponding sulfonic acid) with diethanolamine. Other useful intermediates may be prepared by treating the 2-chloro-3,5-benzenesulfonyl chloride with amines such as dimethylamine, methylamine, ethanolamine and 2,2'-iminobis propionitrile.

14. N,N'-bis[bis(2 - hydroxyethyl)]-4-bromo-m-benzene disulfonamide, which may be prepared by the bis chlorsulfonation of bromobenzene, followed by reaction of the sulfonyl halogens with diethanolamine. If the amine used with the disulfonyl chloride is 2-iminobis propionitrile, the resulting compound is N,N'-bis[bis-(2 - cyanoethyl)] - 4 - bromo-m-benzenedisulfonamide. Other amines, such as methylamine, dimethylamine, ethanolamine etc. may also be used.

II. An α-haloanthraquinone may be condensed with an aminoarylsulfonamide in the presence of an acid acceptor such as sodium carbonate, bicarbonate or acetate and a catalyst such as copper, cuprous salts or cupric salts. The compounds may be caused to react by heating in the presence or absence of a diluent of the organic type such as nitrobenzene, quinoline, pyridine and the like.

Examples of an α-haloanthraquinone which one may use are:

1-chloroanthraquinone
1-bromoanthraquinone
4-chloro-1-hydroxyanthraquinone
4-bromo-1-hydroxyanthraquinone
5-chloro-1-hydroxyanthraquinone
5-bromo-1-hydroxyanthraquinone
5-chloroquinizarin
5-bromoquinizarin
4-chloroanthrarufin
4-bromoanthrarufin
4-chlorochrysazin
4-bromochrysazin
5,8-dichloroquinizarin
5,8-dibromoquinizarin
4,5-dichlorochrysazin
4,5-dibromochrysazin
4,8-dichloroanthrarufin
4,8-dibromoanthrarufin
1,4-dichloroanthraquinone
1,5-dichloroanthraquinone
1,4-dibromoanthraquinone
1,5-dibromoanthraquinone
1,8-dibromoanthraquinone
1-chloro-8-bromoanthraquinone
1,8-dichloroanthraquinone
1-chloro-5-bromoanthraquinone
1-5-diiodoanthraquinone
1,4,5-trichloroanthraquinone
1,4,5,8-tetrachloroanthraquinone
1,4,5,8-tetraiodoanthraquinone
1-amino-4-bromoanthraquinone
1-methylamino-4-bromoanthraquinone
1-ethylamino-4-bromoanthraquinone
1-amino-4-chloroanthraquinone
1-methylamino-4-chloroanthraquinone
1-amino-5-chloroanthraquinone
1-amino-5-bromoanthraquinone
1-amino-8-chloroanthraquinone
1-amino-8-bromoanthraquinone
1-amino-5,8-dibromoanthraquinone
1-benzamido-4-bromoanthraquinone
1-benzamido-4-chloroanthraquinone
1-benzamido-5-chloroanthraquinone
1-benzamido-5-bromoanthraquinone
1,4-dianilino-5,8-dichloroanthraquinone
1-acetamido-4-bromoanthraquinone
1-acetamido-5-bromoanthraquinone Examples of aminoarylsulfonamides are:

$N^1$-methylmetanilamide
$N^1$-methylsulfanilamide
$N^1,N^1$-dimethylmetanilamide
$N^1,N^1$-dimethylsulfanilamide
$N^1$-(2-hydroxyethyl)metanilamide
$N^1$-(2-hydroxyethyl)sulfanilamide
$N^1,N^1$-bis(2-cyanoethyl)metanilamide
$N^1,N^1$-bis(2-cyanoethyl)sulfanilamide
2-methyl-$N^1,N^1$-bis(2-hydroxyethyl)metanilamide
2-methyl-$N^1,N^1$-bis(2-hydroxyethyl)sulfanilamide
2-methyl-$N^1,N^1$-bis(2-cyanoethyl)metanilamide
2-methyl-$N^1,N^1$-bis(2-cyanoethyl)sulfanilamide
2-chloro-$N^1,N^1$-bis(2-hydroxyethyl)metanilamide
2-chloro-$N^1,N^1$-bis(2-hydroxyethyl)sulfanilamide
2-chloro-$N^1,N^1$-bis(2-cyanoethyl)metanilamide
2-chloro-$N^1,N^1$-bis(2-cyanoethyl)sulfanilamide Compounds of the metanilamide series can be prepared by chlorosulfonating nitrobenzenes (such as nitrobenzene, o-, m- or p-nitrotoluenes, nitroxylenes, chloronitrobenzenes, etc.) and allowing the sulfonyl chloride so produced to react with ammonia or amines such as methylamine, dimethylamine, ethanolamine, diethanolamine, 2-iminobis propionitrile, and the like, the reaction product so produced then being subjected to reducing conditions so that the nitro group is thereby converted to amino. Similarly, compounds of the sulfanilamide series can be prepared by chlorosulfonating acetanilide or other nuclearly substituted acetanilides and treating the sulfonyl chloride so produced with ammonia or amines such as methylamine, dimethylamine, ethanolamine, diethanolamine, 2-iminobis propionitrile, and the like, the compound so produced then being subjected to hydrolytic conditions such that the acetyl group is removed, leaving the free amine.

III. A 1,4-dihydroxyanthraquinone such as quinizarin, 1,4,5-trihydroxyanthraquinone or 1,4,5,8-tetrahydroxyanthraquinone as its leuco form or in the presence of its leuco form may be allowed to react with aminoarylsulfonamides in the presence or absence of a solvent of the organic type, and often advantageously in the presence of boric acid. The aminoarylsulfonamides cited in II above exemplify the types which may be used herein.

IV. An anthraquinone compound bearing a sulfonic group in the 2-position (relative to an amino group or an hydroxyl group) and bearing in another α-position such as the 4-position a radical

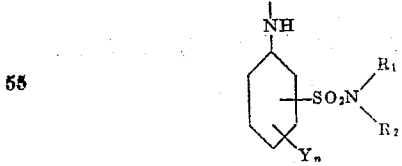

in which the definitions of $R_1$, $R_2$, Y and $n$ are as previously given, may be subjected to desulfonation, as, for instance, by warming with glucose in an aqueous alkaline medium.

V. An α-anilinoanthraquinone may be converted to a sulfonyl halide by treatment with a halosulfonic acid such as chlorosulfonic acid or bromosulfonic acid; or, an α-anilinoanthraquinone sulfonic acid in which the acid radical is attached to the anilino moiety may be treated with a halogenating agent such as chlorosulfonic acid or phosphorus pentachloride to prepare the corresponding sulfonyl halide. The sulfonyl halide so produced can be treated with a variety of amines including methylamine, dimethylamine, ethanolamine, diethanolamine, 2,2'-iminobis propionitrile, etc., in the presence or absence of water or inert organic solvents such as acetone, methyl ethyl ketone, cyclohexanone, benzene, etc., and in the presence or absence of an acid acceptor such as excess amine or sodium carbonate, bicarbonate or acetate to prepare compounds of the type described in the original definition.

The following examples serve to illustrate the invention but they are not intended to limit it thereto. Parts are by weight unless otherwise indicated.

Example 1

Into a reaction flask were charged 250 parts p-bromo-N,N-bis(2-hydroxyethyl)benzenesulfonamide, 160 parts 1-amino-4-hydroxyanthraquinone, 100 parts sodium acetate, 30 parts sodium carbonate, 2.0 parts cupric acetate, and 1320 parts nitrobenzene. The reaction mixture was heated for five hours at 200° C. The solvent nitrobenzene was removed by steam distillation after which the solid condensation product was collected by filtration and dried. It dissolved in acetone with a violet coloration and dyed cellulose acetate in reddish-violet shades possessing absolute fastness to gas fading and outstanding fastness to light. The dyestuff has the structure:

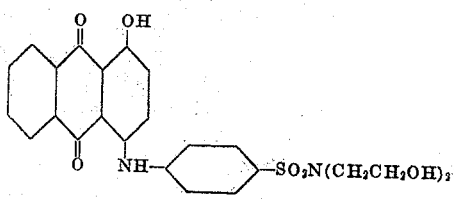

Example 2

The following parts by weight were charged into a suitable reaction vessel:
194 parts p-bromo-N,N-bis(2-hydroxyethyl)benezenesulfonamide, 48.0 parts 1,4-diaminoanthraquinone, 60.0 parts sodium acetate, 30.0 parts sodium carbonate, 2.0 parts cupric acetate, and 1200 parts nitrobenzene. After heating the reactants at 200° C. for 5 hours, a dark green dye was isolated by the method described in Example 1. It was useful for dyeing plastics and spirits. The dyestuff has the structure:

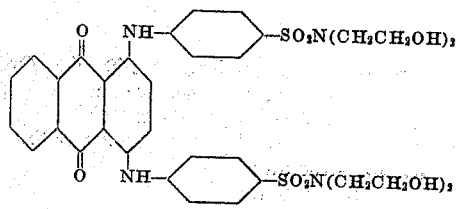

Example 3

In a proper reaction vessel were placed: 249 parts p-bromo-N,N-bis{2-[2-(2-hydroxyethoxy)-ethoxy]ethyl}benzenesulfonamide, 47.6 parts 1,4-diaminoanthraquinone, 50 parts sodium acetate, 10 parts sodium carbonate, 1.0 parts cupric acetate, and 840 parts nitrobenzene.

The components were stirred at 200° C. until a test for unsubstituted α-amino on the anthraquinone was negative. The greenish-blue reaction product, which was isolated in the same way as was the product in Example 1, was appreciably soluble in boiling water and had little affinity for cellulose acetate. It colored lower alcohol and ketone solvents greenish-blue. The dyestuff has the structure:

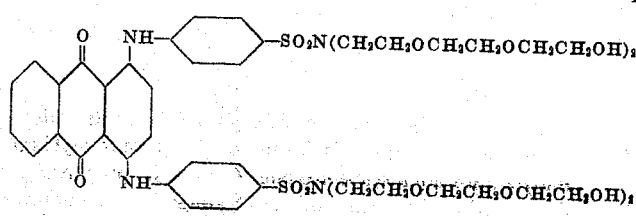

Example 4

A mixture of 396 parts of p-bromo-N,N-dimethylbenzenesulfonamide, 342 parts of 1-amino-5-benzamidoanthraquinone, 150 parts sodium carbonate, 2 parts cupric acetate, and 3600 parts nitrobenzene were stirred for 18 hours at 205° C. The solvent was removed by steam distillation and the solid residue was isolated by filtration. It dyed cotton very fast red tints from a brown vat. The dyestuff has the structure:

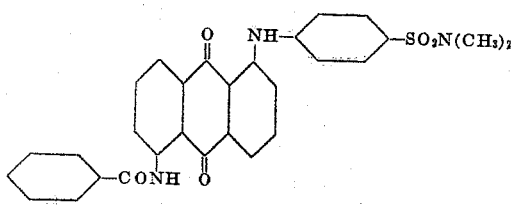

Example 5

When the 1-amino-5-benzamidoanthraquinone in Example 4 was replaced by 1-amino-4-benzamidoanthraquinone, a violet dye was obtained which when dyed as a vat dye yielded strong violet shades on cotton of outstanding fastness properties, particularly to light. The product was then dissolved in sulfuric acid (76%) and stirred briefly at 95° C. The reaction mixture was allowed to cool, whereupon it was poured into water. The solid which precipitated was collected by filtration and washed neutral. The resultant compound, which is $N^1,N^1$-dimethyl-$N^4$-(4-amino-1-anthraquinonyl)-sulfonilamide, dyed cellulose acetate violet-blue shades of excellent fastness to light and very good fastness to gas fading. The dyestuff has the structure:

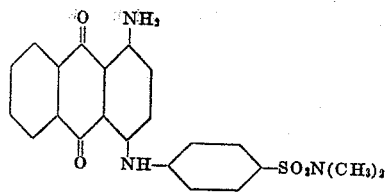

Example 6

A mixture of 216 parts p-bromo-N-(2-hydroxyethyl)-benzenesulfonamide, 160 parts 1-amino-4-hydroxyanthraquinone, 100 parts sodium acetate, 30 parts sodium carbonate, 2.0 parts cupric acetate, and 140 parts nitrobenzene were treated exactly as in Example 1. The dye obtained by this procedure dyed cellulose acetate in red-violet shades of excellent fastness to light and outstanding fastness to gas fading. The dyestuff has the structure:

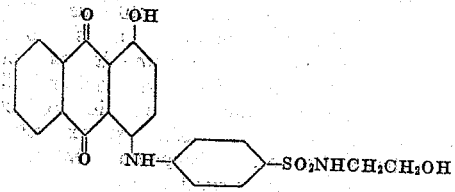

Example 7

If instead of 160 parts of 1-amino-4-hydroxyanthraquinone, as in Example 1 (a) 168 parts of 1-amino-4-methyl-aminoanthraquinone or (b) 180 parts 1-amino-4-ethylaminoanthraquinone and the other parts by weight and procedure of Example 1 were used, then two cellulose acetate dyes were obtained; both were of navy blue shade and possessed uniformly good affinity, excellent light fastness, and very good fastness to gas fading.

(a)
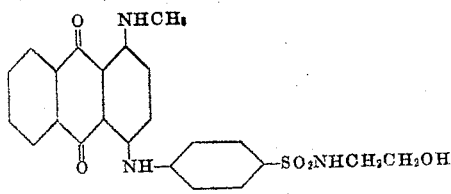

(b)
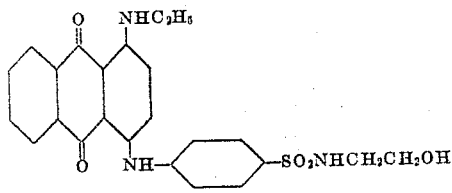

*Example 8*

In a suitable vessel equipped with a heater, a stirrer, a thermometer, and a reflux condenser were placed 68.0 parts 4,8-diaminoanthrarufin, 300.0 parts p-bromo-N,N-bis 2 - [2 - (2 - hydroxyethoxy)ethoxy]ethylbenzenesulfonamide, 53.0 parts sodium carbonate, 42.0 parts sodium acetate, 5.0 parts cupric acetate, 5.0 parts cuprous chloride, and 1100.0 parts nitrobenzene. The mixture was boiled for seven hours, during which time it was stirred. After cooling to 100°, a portion of water was added and steam distillation was carried out until the steam volatile material had been removed. The residue in the vessel was isolated by filtration and dried. It was very soluble in methyl alcohol; it colored water slightly and petroleum ether not at all. The dyestuff has the structure:

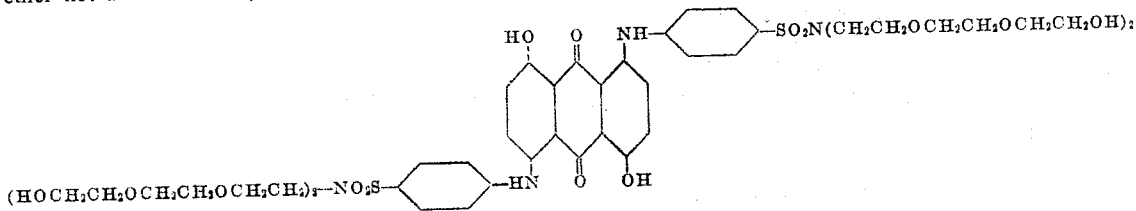

*Example 9*

In a suitable vessel equipped with a heater, a stirrer, a thermometer, and a reflux condenser were placed 135.0 parts 4,8-diaminoanthrarufin, 2200.0 parts nitrobenzene, 442.0 parts p - bromo - N - [2-(2-hydroxyethoxy)ethyl]-N-(2-hydroxyethyl)benzenesulfonamide, 53.0 parts sodium carbonate, 126.0 parts sodium acetate, 5.0 parts cupric acetate, and 5.0 parts cuprous chloride. The mixture while being stirred was maintained at its boiling temperature for five hours, after which time it was cooled to 75°, diluted with 800.0 parts methyl alcohol and allowed to cool to room temperature. The solid product was collected by filtration and washed successively with methyl alcohol and water. Dyeings on cellulose acetate fiber had fastness properties similar to those of Example 8. The dyestuff has the structure:

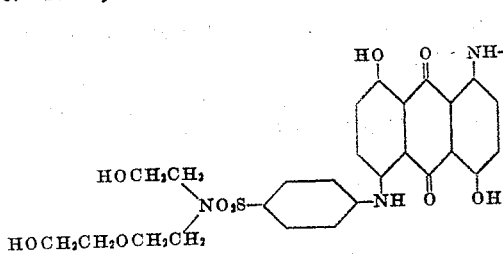

*Example 10*

In a vessel equipped with a thermometer, a heater and a reflux condenser were placed 223 parts 1-aminoanthraquinone, 356 parts p-bromo-N,N-bis(2-hydroxyethyl)-benzenesulfonamide, 168 parts anhydrous sodium acetate, 20 parts cupric acetate, and 3597 parts nitrobenzene. The mixture was heated for two hours at the boiling temperature. It was then allowed to cool. At or below 100° C., a portion of water (approximately 2000 parts) was added and steam distillation was carried out to remove the nitrobenzene. The residue in the distillation vessel was collected by filtration and washed with hot water. After drying it weighed 480 parts. The material dyed cellulose acetate fibers in red shades of excellent properties. The p-bromo-N,N-bis(2-hydroxyethyl)benzenesulfonamide in the above procedure may be replaced by (b) either 308 parts p-bromo-N-(2-hydroxyethyl)benzenesulfonamide or (c) with 290 parts p-bromo-N,N-dimethylbenzenesulfonamide. The resulting products had properties similar to the above.

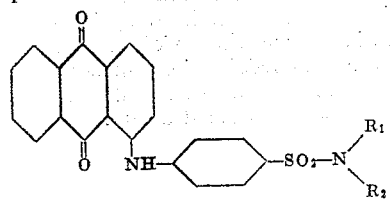

(a) $R_1=R_2=$—$CH_2CH_2OH$
(b) $R_1=$—$CH_2CH_2OH$; $R_2=H$
(c) $R_1=R_2=$—$CH_3$

*Example 11*

In a vessel equipped with a stirrer, a heater, a thermometer, and a condenser were placed 126 parts 1-methylamino-4-bromoanthraquinone, 208 parts $N^1,N^1$-bis(2-hydroxyethyl)metanilamide, 84 parts sodium acetate, 10 parts cupric acetate, and 1199 parts nitrobenzene. The mixture was stirred for eight hours during which time the temperature was maintained at 140° C. On cooling a product settled out; it was isolated by filtration. Dyeings on acetate rayon showed attractive blue shades of good properties especially to gas fume fading. The dyestuff has the structure:

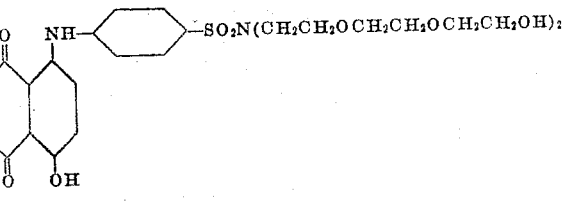

*Example 12*

(a) In a suitable vessel equipped with a stirrer, a heater and a thermometer were placed 10 parts sodium 1 - amino - 4 - {m - [bis(2 - hydroxyethyl)sulfamyl]anilino}-2-anthraquinone-sulfonate (which is prepared by the reaction between sodium 1-amino-4-bromoanthra-

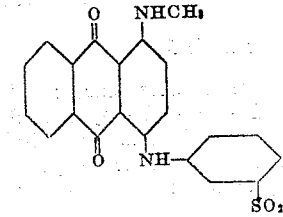

quinone-2-sulfonate and N¹,N¹-bis(2-hydroxyethyl)metanilamide) and 500 parts water at 95° C. Then was added with stirring 14 parts glucose. Then was added with stirring enough potassium hydroxide solution (20%) to cause precipitation (about 100 parts). The precipitated dyestuff was collected by filtration and washed free from water soluble materials. The dried product, which weighed 7 parts, colored acetate rayon in reddish-blue shades of good properties. The resistance to the combustion fumes of illuminating gas was surprisingly good and the light-fastness was excellent.

(b) Removal of the sulfonic acid group of 1-amino-4-[m - (2 - hydroxyethylsulfamyl)anilino] - 2 - anthraquinone sulfonic acid gave a product which dyed substantially the same as the one described. The properties of the dyeings were also similar. The dyestuff has the structure:

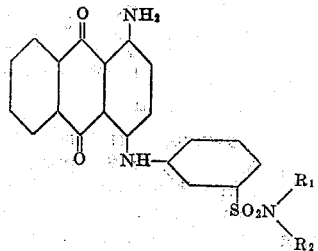

(a) R₁=R₂=—CH₂CH₂OH
(b) R₁=—CH₂CH₂OH; R₂=H

*Example 13*

(a) In a suitable vessel equipped with a stirrer, a heater, a condenser and a thermometer were placed 170 parts 1-amino-4-[(2-hydroxyethyl)amino]anthraquinone, 260 parts p-bromo-N,N-bis(2-hydroxyethyl)benzenesulfonamide, 168 parts sodium acetate, 10 parts cupric acetate, and 1199 parts nitrobenzene. The mixture was stirred at 180° C. until the reaction was completed. After cooling and adding water, steam distillation was conducted to remove the solvent. The product which settled out of the pot residue was isolated and dried. It weighed 390 parts. Dyeings made with it on cellulose acetate fiber showed attractive blue shades of excellent properties; the resistance to combustion gas fumes was surprisingly good. In the above reaction (b) p-bromo-N-(2-hydroxyethyl)benzenesulfonamide or (c) p-bromo-N,N-dimethylbenzenesulfonamide may be substituted in equivalent amounts for the p-bromo-N,N-bis(2-hydroxyethyl)benzenesulfonamide without engendering profound changes in the properties of the product. The dyestuff has the structure:

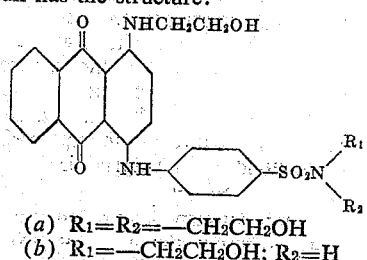

(a) R₁=R₂=—CH₂CH₂OH
(b) R₁=—CH₂CH₂OH; R₂=H
(c) R₁=R₂=—CH₃

*Example 14*

In a suitable vessel equipped with a stirrer, a thermometer, a heater, and a reflux condenser were placed 135.0 parts 4,8-diaminoanthrarufin, 2200.0 parts nitrozenzene, 389.0 parts p-bromo-N,N-bis(2-hydroxyethyl)benzenesulfonamide, 106.0 parts sodium carbonate, 84.0 parts sodium acetate, 5.0 parts cupric acetate, and 5.0 parts cuprous chloride. The temperature of the mixture was maintained at its boiling point for 2½ hours, during which time it was stirred. The mixture was allowed to cool to 75°, whereupon 800.0 parts methyl alcohol was added while stirring. Agitation was stopped and the mixture allowed to cool to room temperature. The solid which had separated was removed by filtration and washed first with methyl alcohol, then with water. It was then dried. Dyeings of this material on cellulose acetate fiber had excellent fastness to light and washing and unexpectedly good fastness to the action of the combustion products of illuminating gas and to the action of an aqueous solution of nitrous acid. The dyestuff has the structure:

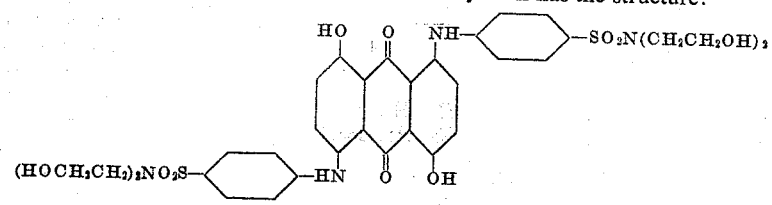

*Example 15*

(a) Into a reaction vessel equipped with a condenser and an efficient stirrer were placed 10 parts quinizarin, 2 parts leucoquinizarin, 12 parts N¹,N¹-bis(2-hydroxyethyl)-metanilamide, 3 parts anhydrous boric acid and 60 parts cyclohexanol. The reaction mixture was heated at reflux for nine hours. The cyclohexanol was removed by steam distillation and 3 parts sodium hydroxide pellets were added to the hot aqueous mixture and a slow stream of air was introduced for one hour. The mixture was then allowed to cool to room temperature and filtered. The precipitate was suspended in 150 parts water at 60° C. and 3 parts sodium hydroxide pellets were added. This mixture was stirred for fifteen minutes, cooled and filtered. The product was obtained in a yield of 61.6%. It dyed acetate rayon in violet shades of excellent light and gas fastness. In the above example, the N¹,N¹-bis(2-hydroxyethyl)metanilamide may be replaced by an equivalent amount of any of the following (b) N¹-(2-hydroxyethyl)metanilamide, (c) N¹,N¹-dimethylmetanilamide, and (d) N¹-ethylmetanilamide. The dyestuff has the structure:

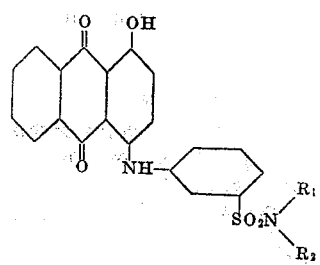

(a) R₁=R₂= —CH₂CH₂OH
(b) R₁= —CH₂CH₂OH; R₂=H
(c) R₁=R₂= —CH₃
(d) R₁= —CH₂CH₃; R₂=H

*Example 16*

(a) 13.6 parts leucotetrahydroxyanthraquinone, 14.0 parts N,N-bis(2-hydroxyethyl)metanilamide, 6.0 parts anhydrous boric acid, and 75.0 parts cyclohexanol were charged into a reaction vessel equipped with an efficient stirrer and reflux condenser. The reaction mixture was heated at reflux for fourteen hours, and then the cyclohexanol was removed by steam distillation. On cooling the solid was filtered off, washed with water and then dried in an oven at 60° C. The dried product, which weighed 18.9 parts, was charged into a reaction vessel containing 100 parts nitrobenzene and 0.5 part piperidine. The solution was heated at reflux for two and a half hours.

The nitrobenzene was then removed by steam distillation. The product was filtered off and washed with warm water. After drying at 60° C. the product weighed 18.47 parts. It dyed acetate in blue-violet shades of good light and gas fastness. In the above example, the N¹,N¹-bis(2-hydroxyethyl)metanilamide may be replaced by an equivalent amount of any of the following: (b) N¹-(2-hydroxyethyl)-metanilamide, (c) N¹,N¹-dimethylmetanilamide or (d) N¹-ethylmetanilamide. The dyestuff has the structure:

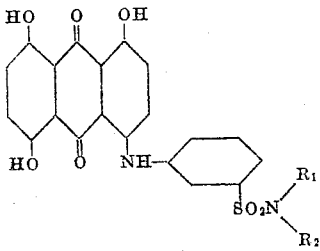

(a) R₁=R₂= —CH₂CH₂OH
(b) R₁= —CH₂CH₂OH; R₂=H
(c) R₁=R₂= —CH₃
(d) R₁= —CH₂CH₃; R₂=H

Example 17

6 parts 1-hydroxy-4-o-toluinoanthraquinone was added slowly with stirring to 18 parts chlorosulfonic acid at 0-5° C. This solution was then warmed on a water bath at 75° C. for two hours. The excess chlorosulfonic acid was then destroyed by pouring this solution into cracked ice. The solid sulfonyl chloride was filtered off and washed neutral with cold water. The moist cake was added to a flask containing 150 parts acetone and 4 parts diethanolamine. This solution was allowed to stand at room temperature for sixteen hours. The acetone was removed by distillation and 150 parts water was added. The solid was filtered off and dried yielding 6.03 parts of product. This product dyed acetate rayon in violet shades of excellent light and gas fastness. The dyestuff has the structure:

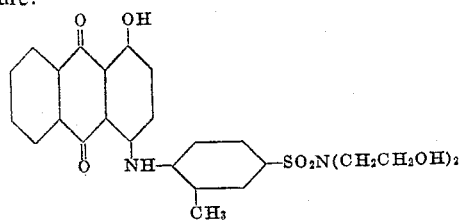

Example 18

6 parts 1-o-toluino-4,5,8-trihydroxyanthraquinone was added slowly to 26.0 parts chlorosulfonic acid at 0-5° C. This solution was warmed slowly to 65° C. and maintained at this temperature for one and a half hours. The reaction mixture was then drowned in ice, and the solid sulfonyl chloride was filtered off, washed with water, and then added to a solution of 100 parts acetone and 3 parts diethanolamine. This solution was allowed to stand at room temperature for twenty-four hours. The acetone was removed by distillation and 100 parts water was added to the residue. This suspension was warmed at 80° C. for one hour, and then cooled and filtered. The dried product weighed 6.33 parts. Cellulose acetate fiber was dyed fast blue shades with it. The dyestuff has the structure:

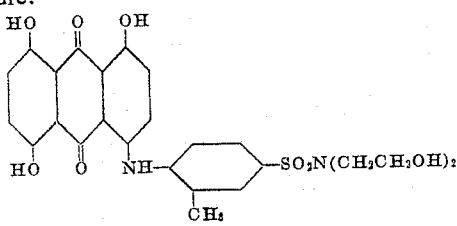

Example 19

30 parts 1-p-anisidino-4-hydroxyanthraquinone was added in small portions to a stirred solution of 132 parts chlorosulfonic acid at 0-5° C. When the addition was complete, the reaction mixture was allowed to come to room temperature slowly, and it was then warmed at 65-75° C. for one and a half hours. The reaction mixture was then poured with vigorous stirring into 2000 parts chipped ice. The solid sulfonyl chloride was filtered off and washed neutral with cold water. The moist cake was charged into a reaction vessel containing 400 parts acetone and 33 parts diethanolamine. This mixture was warmed to reflux and then allowed to stand at room temperature for twenty hours. The acetone was distilled off and the product was precipitated by the addition of 400 parts water at 65° C. The product was filtered off and washed with hot water. After drying at 60° C., 35.6 parts of product was obtained, which dyed acetate violet shade of excellent fastness. The dyestuff has the structure:

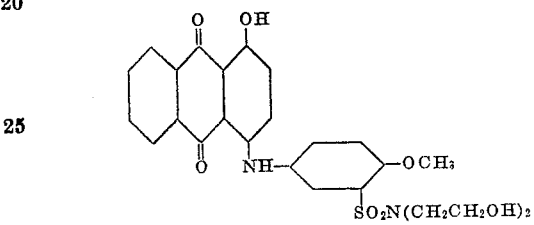

Example 20

2.0 parts 1,4-di-p-toluinoanthraquinone was added in small portions with stirring to 9.0 parts chlorosulfonic acid at 0-5° C. When this addition was complete, the reaction mixture was warmed at 65-70° C. for two hours. At the end of this time, the reaction mixture was added with vigorous stirring to 200 parts chipped ice. The sulfonyl chloride was filtered off, washed with cold water, and then the moist cake was charged into a reaction vessel containing 50 parts acetone and 1 part diethanolamine. The solution was allowed to stand for twenty-four hours. The acetone was removed by distillation. Then 50 parts water was added and the suspension was warmed at 80° C. for one hour. On cooling the product was filtered, washed and then dried. The product weighed 2.19 parts. The dyestuff has the structure:

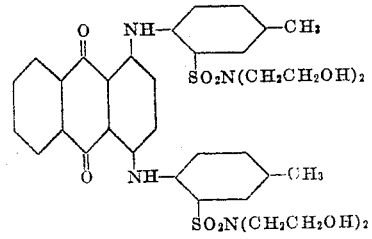

Example 21

30 parts 1-hydroxy-4-p-toluinoanthraquinone was added in small portions with stirring to 132 parts chlorosulfonic acid at 0-5° C. When this addition was complete, the reaction mixture was allowed to come to room temperature. After one hour at room temperature, the reaction mixture was warmed at 65-70° C. for one and a half hours. The reaction mixture was then poured with vigorous stirring into 2000 parts chipped ice. The sulfonyl chloride was filtered off and washed with cold water. The moist cake was charged into a reaction vessel containing 400 parts acetone and 33 parts diethanolamine. This solution was warmed to reflux and then allowed to stand at room temperature for twenty-four hours. The acetone was removed by distillation and the product was precipitated by the addition of 400 parts water at 65° C. containing 20 parts concentrated hydrochloric acid. On cooling the product solidified, and it was filtered off and washed with water. On drying at 60° C., 43.0 parts of product were obtained, which dyed cellulose acetate in violet shades of excellent fastness to light and to combustion gas fumes. The dyestuff has the structure:

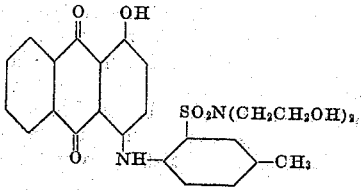

*Example 22*

6.0 parts 1,5-di-p-toluinoanthraquinone was added slowly with stirring to 18.0 parts chlorosulfonic acid at 0–5° C. This solution was warmed at 100° C. for two hours. The solution was then poured slowly with stirring into a mixture of ice and water. The solid which separated was filtered off and washed neutral with cold water. The moist cake was then added to 100 parts acetone containing 2.0 parts monoethanolamine. This solution was allowed to stand at room temperature for twenty-four hours. The acetone was distilled off and 100 parts water was added. The aqueous suspension was acidified and the product dyed acetate rayon in blue-violet shades of good light and gas fastness. The dyestuff has the structure:

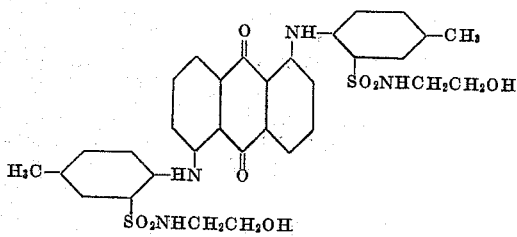

*Example 23*

(a) Into a flask equipped with stirrer and condenser were charged 10 parts of 1-aminoanthraquinone, 18 parts p-bromo-N,N-bis(2-hydroxyethyl)benzenesulfonamide, 8 parts sodium carbonate, 0.5 part cupric acetate and 100 parts nitrobenzene. The reaction mixture was heated at 150° C. for eight hours. The nitrobenzene was then removed by steam distillation and the product was filtered off. The solid was washed with methanol and dilute hydrochloric acid. This product was dried at 60° C. and weighed 13.2 parts. This product dyed acetate rayon in red shades of excellent light and gas fastness. In this example, in place of p-bromo-N,N-bis(2-hydroxyethyl)benzenesulfonamide, the following compounds may be used in equivalent amounts: (b) p-bromo-N-(2-hydroxyethyl)benzenesulfonamide and (c) p-bromo-N,N-dimethylbenzenesulfonamide. The dyestuff has the structure:

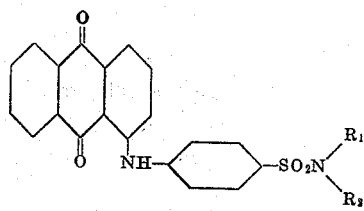

(a) $R_1=R_2=$—$CH_2CH_2OH$
(b) $R_1=$—$CH_2CH_2OH$; $R_2=H$
(c) $R_1=R_2=$—$CH_3$

*Example 24*

10 parts 6-chloro-1-p-toluinoanthraquinone was charged with efficient stirring into 30 parts chlorosulfonic acid cooled to 0–5° C. by an ice bath. The reaction mixture was stirred at room temperature for one hour and then at 120° C. for two hours. The excess chlorosulfonic acid was destroyed by pouring the reaction mixture into ice. The sulfonyl chloride was filterd off and washed neutral with ice water. The moist cake of the sulfonyl chloride was then charged into a flask containing 150 parts acetone and 8 parts diethanolamine. This reaction mixture was allowed to stand at room temperature for twenty-four hours. The acetone was removed by distillation and 300 parts water containing 10 parts concentrated hydrochloric acid was added. The mixture was stirred and warmed at 80° C. for fifteen minutes. The product was then filtered off and washed with 100 parts water. The product was dried at 60° C. It dyed acetate in scarlet shades of excellent light and gas fastness. The dyestuff has the probable structure:

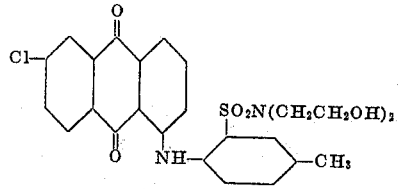

*Example 25*

10 parts 1,5-di-p-toluino-4,8-dihydroxyanthraquinone was added with stirring to 40 parts chlorosulfonic acid at 5° C. When this addition was completed, the reaction mixture was stirred at room temperature for one hour, and then at 80° C. for two hours. The excess chlorosulfonic acid was destroyed by pouring the reaction mixture into 400 parts chipped ice. The product was filtered off and washed with ice water until neutral. The moist cake was then charged into a flask containing 150 parts acetone and 15 parts diethanolamine. This reaction mixture was allowed to stand at room temperature for twenty-four hours. The acetone was removed by distillation and 300 parts water containing 20 parts concentrated hydrochloric acid was added. This mixture was warmed at 80° C. in a steam bath for one hour and then cooled and filtered, and washed with warm water. The product was obtained in a yield of 74.1% and dyed acetate rayon in blue shades of good light and gas fastness. The dyestuff has the structure:

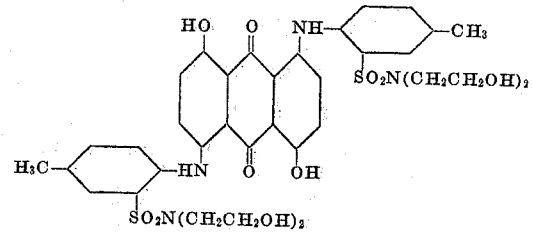

*Example 26*

Into a suitable reaction vessel were charged 5.0 parts p-(4-amino-1-anthraquinoylamino)-N-methylacetanilide, 5.0 parts p-bromo-N,N-bis(2-hydroxyethyl)benzenesulfonamide, 2.5 parts anhydrous sodium carbonate, 0.5 part cupric acetate and 40 parts nitrobenzene. The reaction mixture was heated at 180° C. for three hours, and then at 205° C. for three hours. The nitrobenzene was removed by steam distillation and the solid product was removed by filtration and washed with water. Upon drying 5.7 parts of product was obtained which dyed acetate rayon in blue-green shades possessing excellent gas fastness. The dyestuff has the structure:

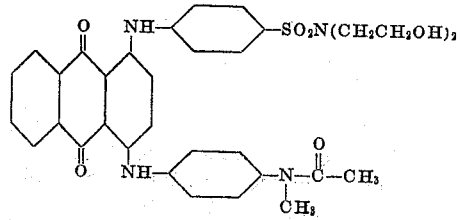

Example 27

Into a suitable reaction vessel were charged 5.0 parts 1-amino-4-hydroxyanthraquinone, 12.0 parts N,N'-bis-[bis(2 - cyanoethyl)] - 4 - bromo-m-benzenedisulfonamide, 3.5 parts anhydrous sodium acetate, 1.0 parts anhydrous sodium carbonate, .5 part cupric acetate and 40 parts nitrobenzene. The reaction mixture was heated at 200-205° C. for 12 hours. The nitrobenzene was removed by steam distillation, and the solid product was removed by filtration. After washing and drying, 9.7 parts of a product was obtained which dye acetate rayon in pink shades possessing excellent fastness properties. The dyestuff has the structure:

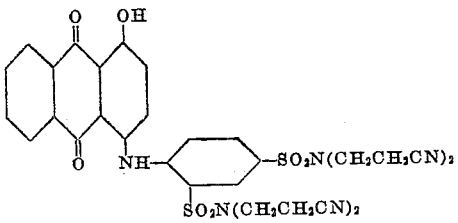

Example 28

Into a suitable reaction vessel were charged 5.0 parts 1-amino-4-hydroxyanthraquinone, 11.5 parts N,N'-bis[bis(2 - hydroxyethyl)] - 4 - bromo - m - benzenedisulfonamide, 3.5 parts anhydrous sodium acetate, 1.0 parts anhydrous sodium carbonate, .5 part cupric acetate and 75 parts nitrobenzene. The reaction mixture was heated at 200–205° C. for eight hours. The nitrobenzene was removed by steam distillation, and the solid product was removed by filtration, washed with water and dried. 10.5 parts of product was obtained which dyed acetate rayon in pink shades which possessed excellent fastness properties. The dyestuff has the structure:

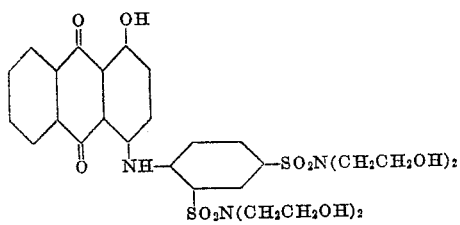

Example 29

In a suitable vessel were charged 120 parts 1-amino-4-hydroxyanthraquinone, 290 parts N,N-bis(2-hydroxyethyl)-2-chloro-3,5-dinitrobenzenesulfonamide, 84 parts anhydrous sodium acetate, 2 parts cupric acetate and 1200 parts chlorobenzene. The mixture was heated to 100° C. and stirred at that temperature for three hours, after which time water was added and steam led in to drive out the solvent. The residue was collected and dried. It dissolved in acetone with an orange coloration and dyed cellulose acetate in very fast reddish-orange shades. The dyestuff has the structure:

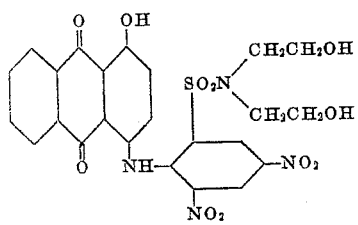

Example 30

Into a suitable reaction vessel were charged 50 parts 1-amino-4-hydroxyanthraquinone, 100 parts 3,4-dichloro-N',N'-bis(2-hydroxyethyl)benzenesulfonamide, 40 parts anhydrous sodium acetate, 20 parts anhydrous sodium carbonate, 2 parts cupric acetate and 400 parts nitrobenzene. The reaction mixture was heated at 200-205° C. for sixteen hours. After cooling the nitrobenzene was removed by steam distillation. The product was collected by filtration and washed with warm water. It dissolved in acetone with a red-violet coloration. When dyed on cellulose acetate this product was found to have very similar properties to the dyestuff described in Example 1. However, the dyeings were found to be appreciably redder. The dyestuff has the structure:

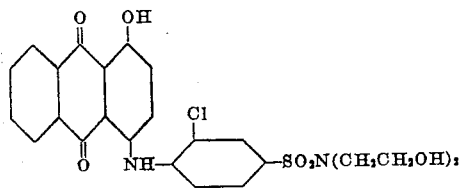

Various modifications and variations of this invention will be obvious to a person skilled in the art and such variations and modifications are to be regarded as within the purview of this application and the spirit and scope of the appended claims.

We claim:

1. A compound of the formula

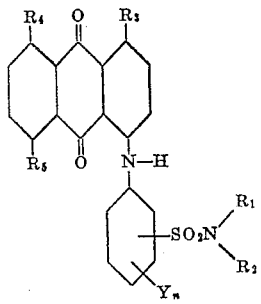

wherein $R_3$, $R_4$ and $R_5$ are selected from the group consisting of hydrogen, hydroxy, amino, alkylamino, arylamino and acylamino, $R_1$ is selected from the group consisting of alkyl, hydroxyalkyl, hydroxyalkoxyalkyl, hydroxypolyalkoxyalkyl, cyanoalkyl and, when taken together

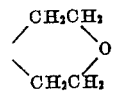

$R_2$ is selected from the group consisting of hydrogen, alkyl, hydroxy alkyl, hydroxyalkoxyalkyl, hydroxypolyalkoxyalkyl, cyanoalkyl and, when taken together

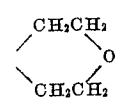

Y is selected from the group consisting of H, Cl, $NO_2$

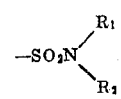

and $n$ has a value of 0 to 2.

2. The compound of the formula

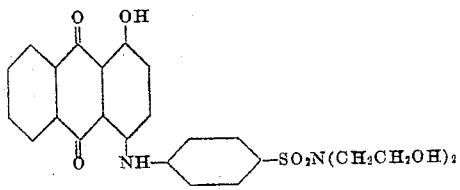

3. The compound of the formula
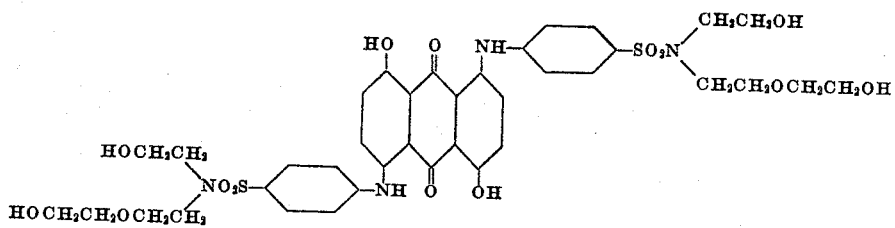
4. The compound of the formula
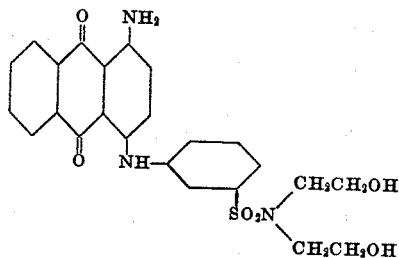
5. The compound of the formula
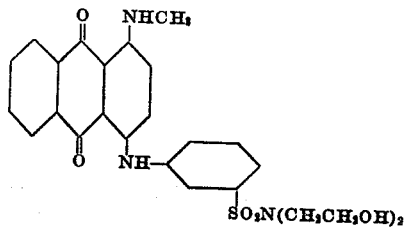
6. The compound of the formula
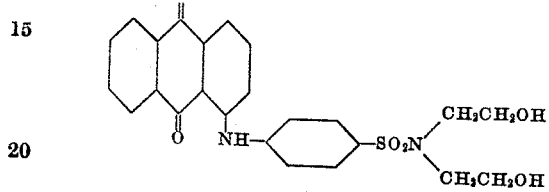
References Cited in the file of this patent
UNITED STATES PATENTS
| | | |
|---|---|---|
| 2,029,239 | Kranzlein et al. | Jan. 28, 1936 |
| 2,029,258 | Diefenbach et al. | Jan. 28, 1936 |
| 2,087,438 | Kranzlein et al. | July 20, 1937 |
| 2,480,269 | Seymour et al. | Aug. 30, 1949 |